Nov. 30, 1971 T. O. PAINE 3,623,360
ADMINISTRATOR OF THE NATIONAL AERONAUTICS
AND SPACE ADMINISTRATION
PRESSURE TRANSDUCER
Filed March 24, 1970 2 Sheets-Sheet 1

CHARLES D. BAKER
INVENTOR

ATTORNEYS

Nov. 30, 1971   T. O. PAINE   3,623,360
ADMINISTRATOR OF THE NATIONAL AERONAUTICS
AND SPACE ADMINISTRATION
PRESSURE TRANSDUCER
Filed March 24, 1970   2 Sheets-Sheet 2
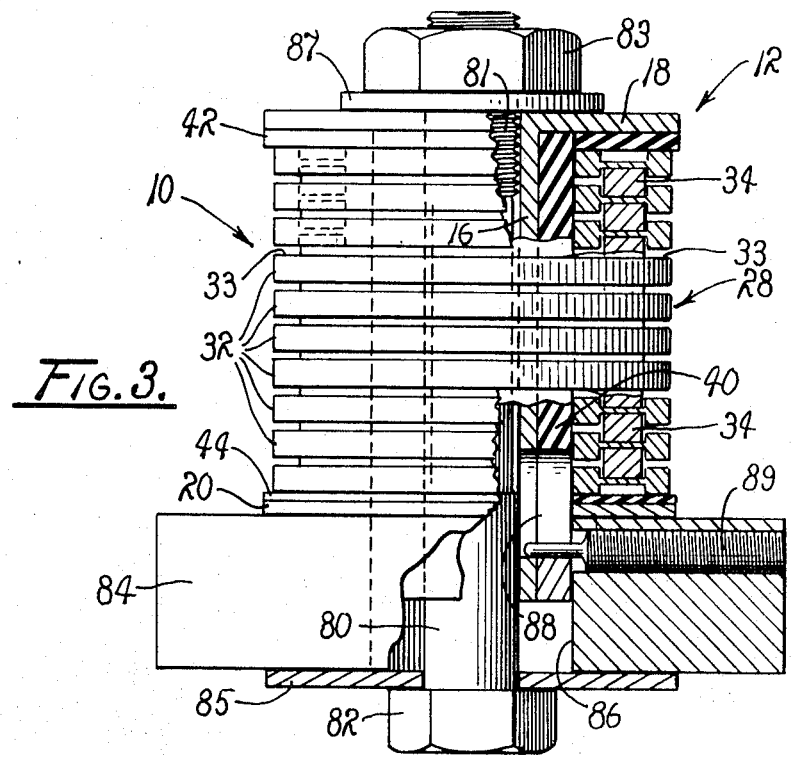
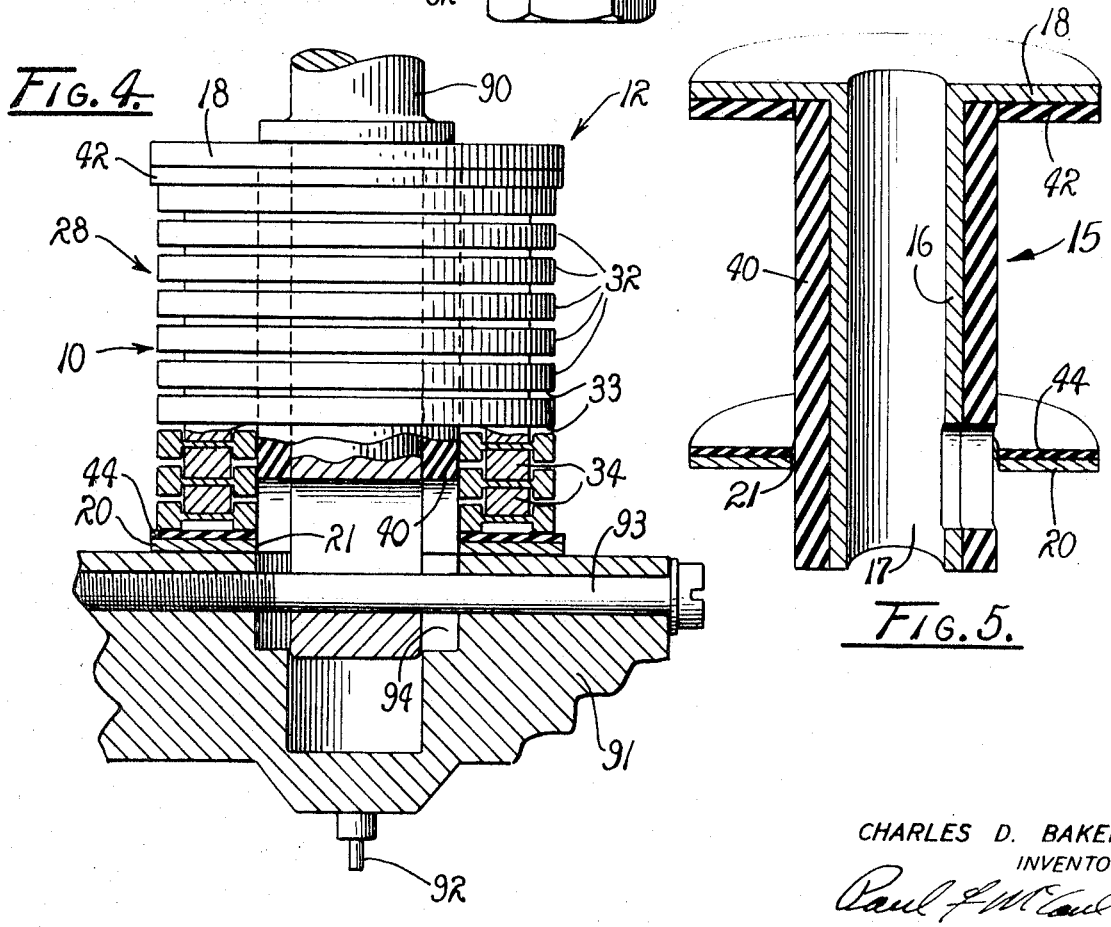
CHARLES D. BAKER
INVENTOR
ATTORNEYS

United States Patent Office 3,623,360
Patented Nov. 30, 1971

3,623,360
PRESSURE TRANSDUCER
T. O. Paine, Administrator of the National Aeronautics and Space Administration, with respect to an invention of Charles D. Baker, La Canada, Calif.
Filed Mar. 24, 1970, Ser. No. 22,265
Int. Cl. G011 1/04
U.S. Cl. 73—141 A
14 Claims

ABSTRACT OF THE DISCLOSURE

A pressure transducer for use in systems employed in measuring forces of compression, characterized by a plurality of spaced electrical conductive elements having interposed therebetween electrical insulators of a controlled resiliency adapted to be sequentially collapsed through stress induced in the presence of an applied compressive force of a continuously increasing magnitude for thereby accommodating a successive engagement of the adjacent surfaces of the conductors, whereby a series of electrical circuits is completed as the magnitude of the applied force is increased, a feature of the transducer being the employment of a current detector circuit connected with each of the conductors so that as an increasing compressive force is applied, and successive conductors are brought into a contiguous relationship, additional circuits are completed for thus establishing a series of electrical signals indicative of the magnitude of the applied force.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION (1) Field of the invention

The invention relates to pressure transducers and more particularly to a pressure transducer particularly suited for use in force measuring systems for measuring the magnitude of compressive forces as the forces are applied to given surfaces.

(2) Description of the prior art

The prior art is replete with pressure transducers wherein the magnitude of applied force is detected and measured. Normally, electrical signals are provided for indicating the magnitude of the applied force. However, such transducers usually are bulky, expensive and relatively complex in design. Such systems frequently employ strain gauges, and the like, electrically coupled with various types of signal amplifying circuits and devices for providing output intelligence signals. Consequently, in instances wherein it is desired accurately to measure compressive forces directly applied to relatively fragile materials, such as for example, substrates employed in supporting various types of electronic components, heretofore available transducers often fail to meet existing needs, due to their bulk and their inherent lack of simplicity and sensitivity. Furthermore, where torque wrenches and the like are employed in determining the force applied to a stud, the resistance to torque rather than compressive force is measured.

OBJECTS AND SUMMARY OF THE INVENTION

It is therefore an object of the instant invention to provide an improved pressure transducer.

Another object is to provide an improved transducer having the capability of detecting and identifying the magnitude of compressive forces as they are directly applied to the transducers.

Another object is to provide an improved pressure transducer for use in a force measuring system adapted to detect and measure compressive forces of a continuously increasing magnitude.

Another object is to provide an improved and simplified pressure transducer characterized by reduced complexity, bulk and weight and which functions with increased sensitivity for detecting and measuring compressive forces with increased accuracy, whereby the transducer is adapted to be employed in material testing operations as well as in machine control circuits for controlling the application of machine-delivered forces.

Another object is to provide an improved pressure transducer which by known mechanical linkages can be conveniently adapted to measure tension, torsion and other forces when translated into compressive forces.

These and other objects and advantages are achieved by employing a plurality of coaxially related, electrical current conducting elements of an annular configuration, each having a pair of spaced contact surfaces, normally maintained in a spaced relationship by insulators provided with a controlled resiliency adapted to collapse in response to induced stress in the presence of a predetermined compressive force, whereby an electrical circuit is established between the contact surfaces of the conductors in accordance with the magnitude of the applied force, so that successive circuits thus are completed for thereby indicating the magnitude of compressive forces applied with an increasing magnitude. Obviously, tension forces can be mechanically translated into compressive forces for similar measurement by the device of the present invention.

BRIEF DESCRIPTION OF THE DRAWINGS

FIG. 3 is a partially sectioned elevation of a test unit illustrating an operative environment for the transducer of FIG. 1.

Figure 1:
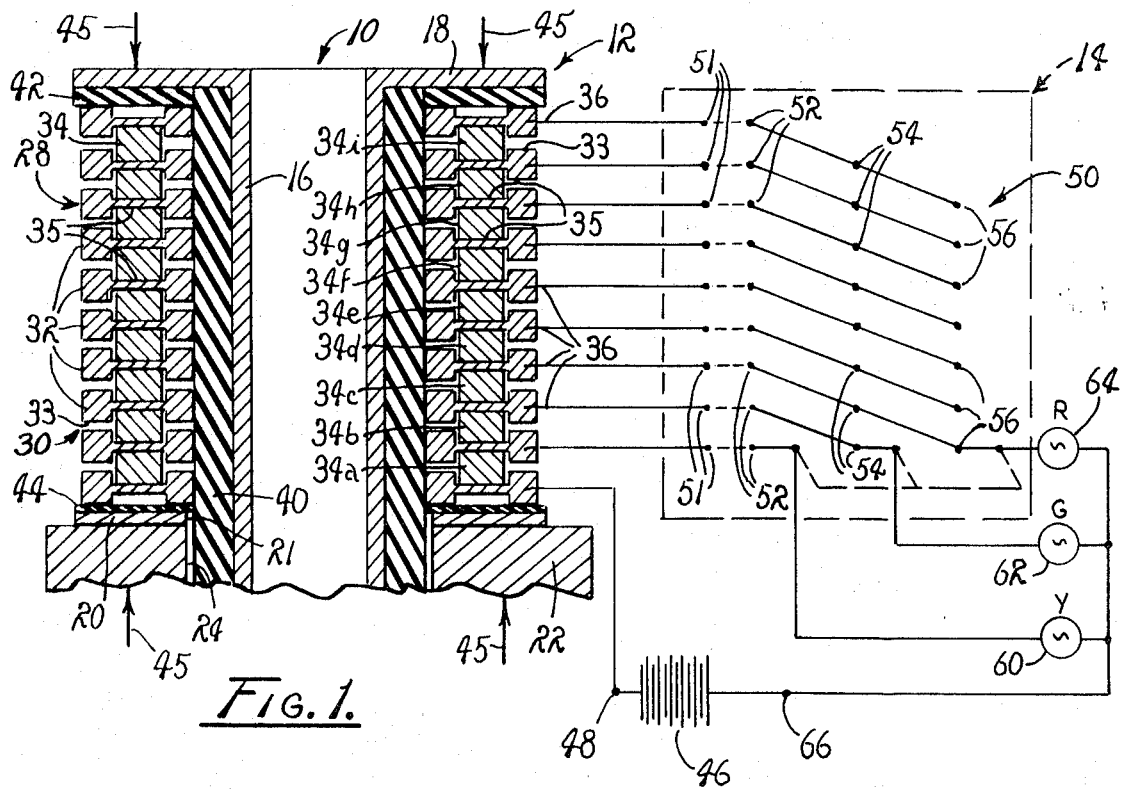
FIG. 1 is a partial cross-sectional elevation of a transducer embodying the principles of the present invention with its associated electrical circuitry being diagrammatically illustrated.

FGI. 4 is a partially sectioned fragmentary view of a tool holder for a punch press adapted to be employed with the transducer of FIG. 1.

FIG. 5 is a partially sectioned, perspective view of a spool utilized in assembling the transducer which embodies the principles of the present invention.

Figure 6:
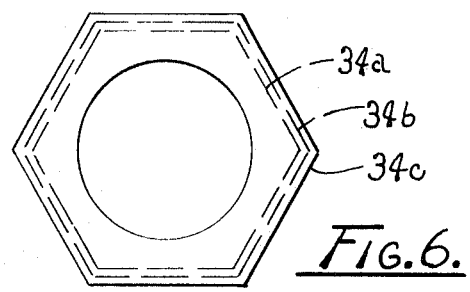

FIG. 6 is a perspective view of a spacer, the resiliency of which is controlled by a severance of peripheral material, which may be employed with the transducers of FIGS. 3 and 4.

DESCRIPTION OF THE PREFERRED EMBODIMENT

Turning to FIG. 1, therein is illustrated a transducer 10, which embodies the principles of the present invention, including a force detection unit 12 electrically interconnected with a read-out unit 14. Together, these units serve to provide optic intelligence indicative of the increasing magnitude of a compressive force as it is applied to the unit 12.

The force detection unit 12 includes a spool 15, FIG. 5, which includes an elongated tubular sleeve 16 having a cylindrical body 17 terminating in an annular end plate 18 rigidly fixed thereto. The spool also includes a displaceable annular plate 20 disposed in a spaced and coaxial relationship with the annular plate 18. The plate 20 includes an annular opening 21 adapted to receive the body 17 of the sleeve 16 in a manner such that a sliding relationship is established therebetween.

In practice, the end plate 20 is supported by a base 22 having an opening 24 of a diameter sufficient to receive the body 17 of the sleeve 16, whereby the sleeve may be axially reciprocated relative to the adjacent surfaces of the opening. Therefore, it can be appreciated that the base 22 and the end plate 20 are, in operation, displaced relative to the external surface of the body 17 of sleeve 16, and that the displacement occurs regardless of whether the sleeve 16 is deemed to be moved into the base 22 or, conversely, the base 22 is deemed to be axially displaced along the surface of the body 17 of the sleeve 16. It should readily be apparent that either the base 22 or the sleeve 16 may be rigidly supported by structure acting in opposition to dynamic forces applied to the transducer 10, so long as the applied forces are compressive and act to achieve a displacement of the sleeve 16 relative to the base 22.

Between the plates 18 and 20, in concentric relation with the sleeve 16, there is disposed a force detecting and measuring assembly 28. The assembly 28 includes a stack 30 of elements 32 having an annular configuration and a pair of opposed surfaces 33 serving as switch contact surfaces. The elements are formed of an electrically conductive material, such as, for example, copper or silver alloys and the like, in order that an electrical current may be passed therethrough. Between the adjacent surfaces 33 of the elements 32 there are disposed spacers, designated 34a through 34i. Each of the spacers has a unique resilience or stress/strain characteristic and normally acts as an electrical insulator. Preferably, each of the spacers is seated and supported within a pair of oppositely disposed annular grooves 35 formed in the sides of each of the elements 32. Due to the resilience of the spacers, they also serve to retain all of the elements 32 in a spaced or open-circuit relationship, so long as a predetermined load condition exists for the force detection unit 12.

Control of the resiliency or the stress/strain characteristics of the individual spacers 34 is achieved by employing various techniques. In usual practice, however, the required resiliency is established by controlling the resiliency of the material from which the spacer is fabricated.

One particularly satisfactory material from which the spacers 34a through 34i have been fabricated is a microballoon-filled RTV (room temperature vulcanized) elastomer. This material includes a predetermined quantity of miniature glass spheres which establish a predetermined number of voids of given dimensions in order that the modulus of elasticity for the material be established at a selected value. This material is more fully described in copending application Ser. No. 24,149, filed Mar. 31, 1970. Since the specific material from which the spacers are formed forms no specific part of the instant invention, a detailed description thereof is omitted. However, it is to be understood that each of the spacers 34a through 34i is fabricated from a material characterized by a stress/strain relationship such that the magnitude of the force required to develop stress sufficient to deform the various spacers through a distance sufficient for effecting an electrical contact between adjacent surfaces 33 of adjacent elements 32 is a value known as precisely as overall performance accuracy is required.

Figure 2:
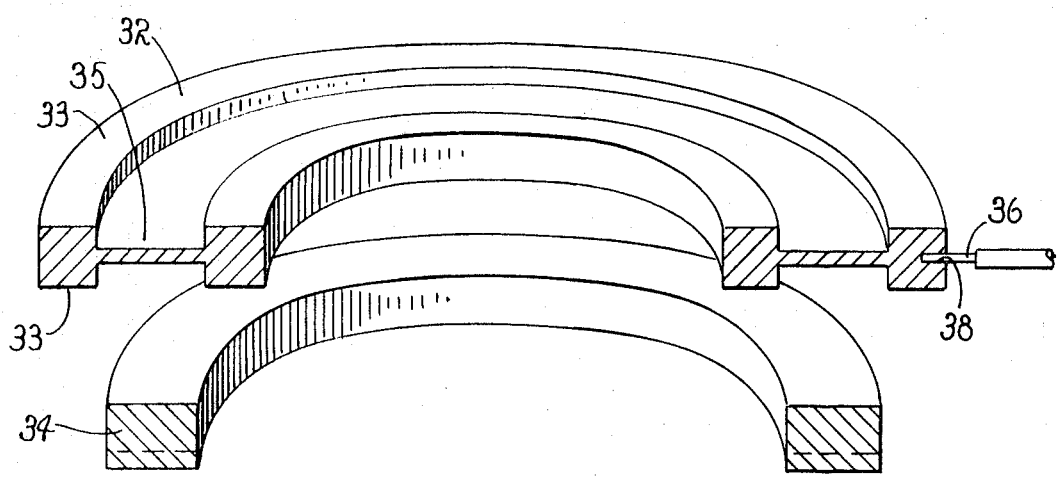
FIG. 2 is a partially sectioned, perspective view of an electrical conductor and its associated spacer as provided for the transducer of FIG. 1.

While the material employed in fabricating the spacers 34a through 34i is provided with a predetermined and unique modulus of elasticity, so that each spacer within the stack has a unique resilience characteristic, it is important to note that controlled deformation of the spacers 34a through 34i can be achieved by fabricating all of the spacers from a material having a similar modulus of elasticity, and then dimensioning them in a manner such that each of the employed spacers resists deformation to a predetermined individual extent. Consequently, each spacer is provided with a unique resiliency. Dimensioning may be effected by controlling the thickness of the spacers, or their axial dimension, as indicated, by dash lines, in FIG. 2. However, it has been deemed practical to sever material from the periphery of the spacer along selected chords of differing lengths, in a manner as indicated by dash lines in FIG. 6. By removing a selected quantity of material from the periphery of each of the spacers, its resiliency is controllably altered.

From the periphery of each of the elements 32 there is a radially extended electrical lead 36. The leads 36 may be coupled with the elements 32 in any suitable manner, however, as presently employed, each of the elements 30 is provided with a radially extended peripheral opening 38, FIG. 2, into which an end of a lead 36 is inserted for purposes of establishing an electrical coupling therebetween. The leads 36 then are soldered in place within the openings 38 for thus permanently coupling the leads 36 to the elements 32.

If desired, the sleeve 16 may be electrically insulated from the surfaces of the elements 32, by a flexible, tubular sleeve 40 fabricated from a suitable electrical insulating material concentrically arranged about the sleeve and interposed between the internal surfaces of the elements 32 and the external surfaces of the sleeve 16. Consequently, any electrical contact between the surfaces of the sleeve 16 and the various elements 32 is precluded. In practice, a pair of insulator plates 42 and 44 also are interposed between the plates 18 and 20 and their adjacent elements 32 in order electrically to insulate the end plates as an electrical current is delivered through the leads 36.

As indicated by force vector arrows 45, FIG. 1, the force detection unit 12 is employed in an environment wherein a compressive force is applied in axial directions to the stack 30 of elements 32. When employed in measuring the magnitude of an applied compressive force the elements 32 are successively brought into contiguous engagement in a predetermined sequence. By prearrangement, the particular sequence employed can be initiated at any suitable point within the stack 30. However, as a practical matter, it is preferable to initiate the sequence at a point located at one end of the stack 30. For example, the spacer 34a first is collapsed, followed by a sequential collapse of the remaining spacers 34b through 34i until all of the spacers within the stack 30 are collapsed or, alternatively, the compressive force applied to the transducer 10 is dissipated. Therefore, it is to be understood that as the magnitude of the force applied to the stack is increased, the resulting stress is increased and the spacers 34a through 34i are collapsed in a predetermined sequence, whereupon the adjacent faces 33 of the elements 32, at opposite sides of the spacer, successively are brought into a current-conducting or switch-closing engagement.

Where the spacer 34a is collapsed to initiate the collapsing sequence for the spacers 34a through 34i, the lead 36 extending radially from the first-in-line element 32, adjacent to the insulator plate 44, is coupled in series with one side of a DC source of voltage 46, at a terminal 48, in order that the electrical potential of this element be established and maintained at that of the source, whereby the voltage of the source is imposed on each of the elements 32 as engagement therebetween is achieved.

In order to detect a deforming collapse of the spacers 34a through 34i, as stress therein is increased, and thereby measure the magnitude of the compressive force applied to the transducer 10, each of the leads 36 is extended to one of a plurality of input terminals 51 provided for a rotary switch 50 located within the read-out circuit 14. As illustrated, the switch 50 also includes a plurality of contact terminals, designated 52, 54 and 56, of a type normally found in commercially available rotary three-pole, seven-position switches. These terminals are so arranged that the rotor of the switch, not shown, may be disposed through seven successive steps or positions, whereby the three poles successively are "set" to connect the terminals 52, 54 and 56 with a selected series of adjacent elements 32.

Each of the terminals 52, 54 and 56 separately is connected in circuit series with an electrically energizable current detector and indicator, such as, for example, lamps 60, 62 and 64. Each of these lamps is adapted to be electrically energized and illuminated to radiate light waves at selected wave lengths to produce colors, such as green, yellow and red, for example. To achieve independent illumination, each of the lamps is connected between a given one of the terminals 52, 54 and 56 and a terminal 66 located at one side of the voltage source 46 so that an electrical circuit may be completed between the opposite sides of the sources 46 through a given one of the contact terminals of the switch 50 and an associated one of the lamps.

Consequently, when the switch 50 is closed, at the contact terminals 52 through 56, the associated elements 32 are coupled with the terminal 66 of the voltage source 46 by circuit leads extending through the lamps 60, 62 and 64. When a circuit now is completed between the contact surfaces 33 of given elements 32 and the terminal 48 of the voltage source 46, associated lamps are illuminated for thereby indicating the magnitude of the applied force.

If desired, the three-pole switch 50 may be replaced by a panel of continuously closed circuits, not shown, each having connected therewithin a given visual indicator, such as the lamps 60, 62 and 64, for example, adapted to be illuminated as the spacers 34a through 34i are collapsed and to radiate selected colors and shades of colors or combinations of shades of colors, so that as the elements 32 sequentially are engaged, the lamps are caused sequentially to be illuminated without necessitating the re-setting of a switching circuit. Of course, audible warning devices can be employed in conjunction with or in lieu of the visual indicator.

While the transducer 10 is intended to be employed in any environment, wherein the magnitude of compressive force is to be applied and measured, operative environments for the transducer 10 are best illustrated in FIGS. 3 and 4. As illustrated in FIG. 3, the force load imposed on the stack 30 is delivered through a spindle-like arbor 80 having a screw-threaded terminal portion 81 and a hex-head mounting portion 82. The arbor 80 axially is extended through the sleeve 16. In practice, the arbor 80 is a stud-bolt operatively mated with a screw-threaded nut 83. The nut 83 threadably receives the screw-threaded terminal portion 81 of the arbor 80 and is advanced therealong for applying a compressive force of an increasing magnitude to the stack 30.

As illustrated in FIG. 3, the transducer 10 may be employed for purposes of determining the magnitude of compressive force applied to a substrate 84 for each advancing turn of the nut 83 so that the point of fracture for the material of the substrate may be determined. Consequently, the arbor 80 is provided with a suitable annular washer 85, confined between the hex-head 82 and the adjacent surface of the substrate 84 as the arbor 80 is received within an opening 86 suitably formed in the substrate. As the nut 83 is advanced, tension is applied to the arbor 80, between its end portions and a resulting compressive force is applied to the stack 30. The nut 83 may be a crown-nut however, it is preferred that an annular washer 87 be employed with the nut 83.

In assembling the transducer 10, the sleeves 16 and 40 are appropriately slotted to provide concentric openings 88 which receive therein the distal end of an externally threaded retention pin 89 threadingly inserted into the substrate 84. By employing the pin 89, assembly of the transducer 10 is simplified as the sleeves 16 and 40 are supported against displacement relative to the substrate. The pin 89 also may be employed as a stop mechanism for limiting the axial displacement operatively imparted to the sleeve.

By employing the transducer 10, in the manner illustrated in FIG. 3, it is possible to determine the magnitude of a crushing force as it is developed. This force can be determined for any number of turns of the nut 83 or any portion thereof. Such information particularly is useful in developing specifications for installing studs for securing various types of electronic components and sub-assemblies to various types of substrates and brackets.

By employing the transducer 10, a direct read-out of the forces applied at the instant of fracture for the material of the substrate may be readily detected.

Another environment in which the transducer 10 particularly is useful is illustrated in FIG. 4. As here illustrated, the transducer 10 is coupled at the output of an arbor 90 employed in a punch-press, not shown, and terminates in a tool-holder 91 having a punch, riveting tool, or any other selected working tool 92 suitably secured thereto. The arbor 90 is provided with a pressure collar 93 adapted to mate with the end plate 18 of the transducer 10 as the arbor 90 is extended downwardly through the sleeve 16. As a practical matter, the tool-holder 91 includes a pin and slot coupling having a screw-threaded pin 93 extended through coaxially aligned slots 94 suitably formed in the lowermost portion of the arbor 90. The pin and slot coupling is employed in coupling the stack 30 with the tool-holder 91 in a manner quite similar to that in which the stack 30 is coupled with the substrate 84 employing the pin 89.

Consequently, as the shoulder 93 of the arbor 90 is forced against the plate 18 of the transducer 10, for applying an axially directed force to a working surface through the tool 92, resistance offered to the tool 92, by the working surface, serves to increase the magnitude of compressive stress of the various spacers 34 for thus causing the spacers 34a through 34i to collapse in a predetermined sequence, whereby the conductive elements 32 of the stack 30 successively are brought into a contiguous relationship for thereby establishing a series of electrical circuits between terminals 48 and 66 of the voltage source 46 through the lamps 60 through 64 of the read-out circuit 14, whereby the magnitude of the applied forces readily may be determined by a visual inspection of the lamps.

OPERATION

The operation of the described embodiment of the subject invention is believed to be clearly apparent and is briefly summarized at this point. With the transducer 10 assembled in the manner described, it is placed in an environment wherein a compressive load or force is to be applied against the opposite plates 18 and 20 of the spool 15 for achieving axial displacement of the sleeves 16 and 40 relative to the end plate 20. As this displacement it imposed on the sleeve, an increasing stress is imposed on the spacers 34a through 34i so that a sequential deformation or collapse of successive spacers 34a through 34i is initiated, in response to an increasing magnitude of the applied force as it is applied to the transducer. As collapse of the spacers occurs, adjacent elements 32 are successively caused to assume a contiguous relationship, in face-to-face engagement, so that an electrical current is passed between the engaged elements.

As the elements 32 are brought into a contiguous face-to-face engagement, circuits are sequentially completed between the opposite sides of the voltage source 46 through the stack 30, the switch 50 and the indicator or lamps 60, 62 and 64 for thereby causing the lamps 60, 62 and 64 sequentially to be illuminated as a sequential collapse of the spacers 34a through 34i is achieved.

Where the transducer 10 is employed in detecting the magnitude of a compressive force applied to given material of a selected substrate, utilizing the configuration illustrated in FIG. 3, each partial advancing turn of the nut 83 serves to introduce an increase in the magnitude of the force applied to the spacers 34a through 34i of the transducer 10, and consequently the substrate 84. Therefore, for each turn or partial turn of the nut 83, the resulting crushing force applied to the substrate 84 readily is detected.

Where the transducer 10 is to be employed in a punch-press or similar device, the operative force applied to the arbor 90, in achieving a working stroke of the working tool 92, results in stress employed to induce strain in the spacers 34a through 34i. Consequently, where the applied forces approach a critical value, a release of the mechanism may be achieved through either a manual or a machine release operation.

In view of the foregoing, it should readily be apparent that the transducer 10 has particular utility in detecting and measuring the magnitude of compressive forces and, regardless of its operative environment, the forces applied to the transducer 10 in a spacer compressing direction, imposes a stress on the spacers 34a through 34i which serves to induce strain sufficient to cause the successive pacers to collapse in a predetermined sequence, whereby circuits sequentially are completed through the stack 30 to provide output intelligence indicative of the stress producing force.

In view of the foregoing, it should readily be apparent that the present invention provides an improved transducer of a reduced complexity which functions with increased sensitivity for detecting and measuring compressive forces and having particular utility in increasing the effectiveness of techniques presently employed in mounting eletronic components on fragile substrates.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A pressure transducer responsive to an applied compressive force comprising:
    (A) a plurality of electrically conducting elements superimposed to form a stack of such elements;
    (B) a plurality of spacers formed of a resilient, electrically insulative material, each being interposed between a pair of said elements and supporting the elements in a mutually spaced relationship said spacers being constructed to collapse in response to predetermined compressive stress for thereby permitting adjacent elements to be brought into a contiguous relationship;
    (C) an electrical lead extended from each of said elements of said stack; and
    (D) means including a voltage source connected with said leads for delivering an electrical current through the elements as they are brought into a contiguous relationship.

2. The transducer according to claim 1 wherein said elements and said spacers are of an annular configuration.

3. The transducer of claim 2 wherein said spacers have an outside diameter less than the outside diameter of said elements and an inside diameter which is greater than the inside diameter of said elements.

4. The transducer of claim 3 wherein each of said elements includes a pair of surfaces defining back-to-back annular channels each receiving one of said plurality of spacers therewithin.

5. The transducer of claim 4 wherein each of said spacers is constructed to collapse in response to a different predetermined stress and the arrangement of said spacers in said stack is selected to provide for sequential collapse of adjacent spacers in response to an applied compressive force of increasing magnitude, for thereby establishing a path for electrical current through successive elements of said stack.

6. The transducer according to claim 5 wherein each of said spacers is formed of a material having the unique modulus of elasticity when compared to the remaining spacers of said plurality of spacers.

7. The transducer according to claim 5 wherein each of said insulators is provided with a unique dimension when compared to the remaining spacers of said plurality of spacers.

8. The transducer of claim 1 wherein the voltage source is provided with a first terminal directly connected with the lead of a first element, and a second terminal connected with the lead of a second element, adjacent to said first element, through a circuit including a normally-closed switch and an electrically energizable detector.

9. The transducer of claim 8 wherein said switch is selectively actuatable for coupling selected leads with said voltage source.

10. A transducer for use in compressive force measuring systems comprising:
    (A) a plurality of superimposed, coaxially related electrical conductive elements of an annular configuration;
    (B) means defining electrical contact faces at opposite sides of each of said elements;
    (C) a plurality of annular spacers formed of a resilient electrically insulative material, each spacer being interposed between a pair of adjacent contact faces and supporting the elements in a normally spaced relationship and said spacers being constructed to collapse in response to an application of a compressive force of a predetermined manitude for thereby permitting adjacent elements to be brought into a contiguous face-to-face relationship for establishing an electrical current path therebetween;
    (D) means for applying a compressive force to said transducer;
    (E) a sleeve concentrically extended through the coaxially related spacers;
    (F) an electrical lead extended from each of said elements;
    (G) a voltage source; and
    (H) an electrical circuit including a normally-closed switch and an electrically energizable current detector connecting said source with said elements, whereby an electrical circuit is completed from said source through said elements and said detector as adjacent elements are brought into a contiguous relationship.

11. The transducer of claim 10 wherein said means for applying compressive force to said stack includes a shaft extended axially through said sleeve having a shaft mounting portion and a screw-threaded distal portion mated with an internally screw-threaded nut, whereby as the nut is advanced along the screw-threaded portion of the shaft, tension is applied to said shaft and compresseive stress is induced in said spacers.

12. The transducer of claim 11 wherein the shaft mounting portion is extended through a planar member in a manner such that the compressive force is applied to said planar member as the nut is advanced.

13. The transducer according to claim 10 wherein said means for applying a force to said stack includes a shaft axially extended through said sleeve and having an annular shoulder abutting one end surface of said stack and terminating in a pressure foot arranged at the opposite end of said stack.

14. The transducer of claim 13 wherein said pressure foot includes a tool holder.

References Cited

UNITED STATES PATENTS

| | | | |
|---|---|---|---|
| 2,505,712 | 4/1950 | Jaeschke et al. | 338—115 X |
| 2,991,655 | 7/1961 | Jorgensen et al. | 73—537 |
| 3,235,692 | 2/1966 | Kucera | 200—5C UX |
| 3,247,711 | 4/1966 | Howatt | 73—141 |

CHARLES A. RUEHL, Primary Examiner

U.S. Cl. X.R.

200—85R